Dec. 15, 1953    R. B. SHORE    2,662,459
MEANS FOR DETACHABLY SECURING IMPLEMENTS TO TRACTORS
Filed June 17, 1949                            2 Sheets-Sheet 1
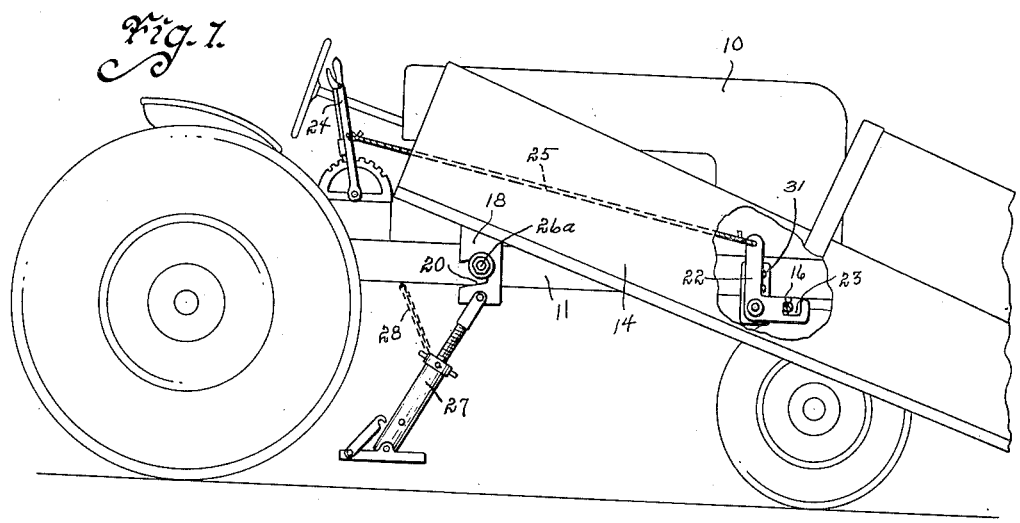
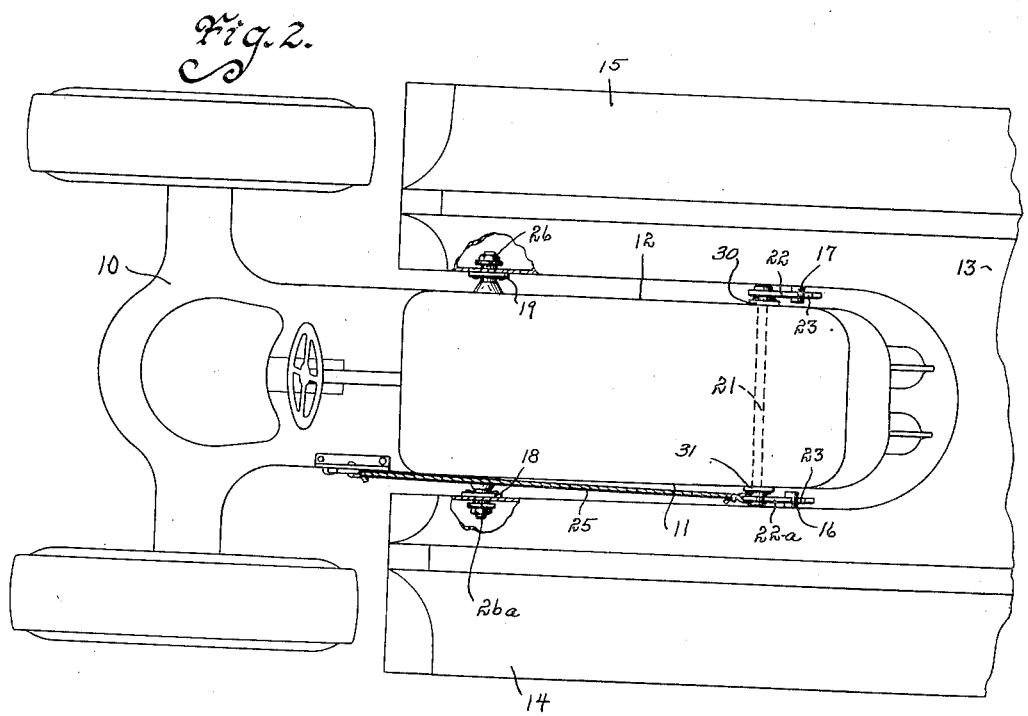

Dec. 15, 1953    R. B. SHORE    2,662,459
MEANS FOR DETACHABLY SECURING IMPLEMENTS TO TRACTORS
Filed June 17, 1949                       2 Sheets-Sheet 2
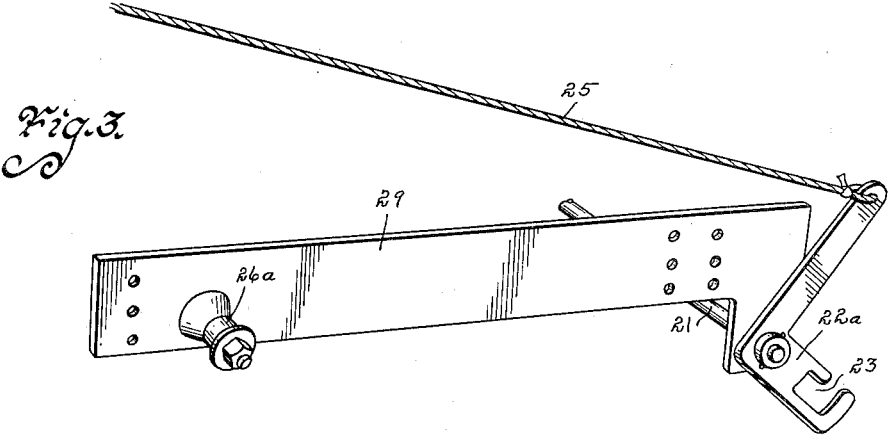
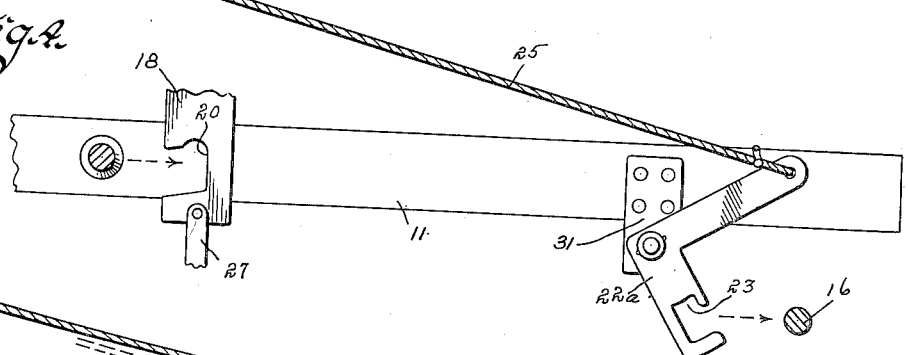
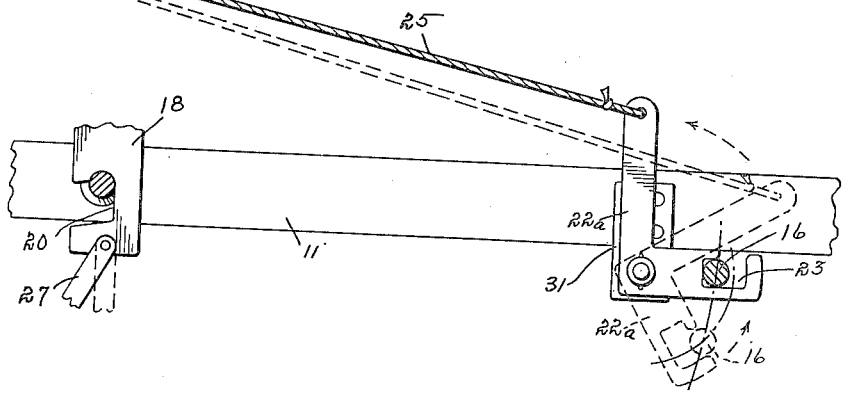
Witness
Edward P. Seeley
Inventor
Richard B. Shore
by M. Talbert Dick
Attorney Patented Dec. 15, 1953

2,662,459

UNITED STATES PATENT OFFICE 2,662,459

MEANS FOR DETACHABLY SECURING IMPLEMENTS TO TRACTORS

Richard B. Shore, Waterloo, Iowa

Application June 17, 1949, Serial No. 99,600

2 Claims. (Cl. 97—47.15)

The principal object of my invention is to provide a quick and easy means for attaching a farm implement such as a corn picker to a tractor.

A further object of this invention is to provide an implement attaching means for tractors that may be operated by the tractor operator and without necessitating his dismounting from the tractor.

A still further object of my invention is to provide an implement attaching means for tractors that may be easily and quickly installed.

A still further object of this invention is to provide a means for detachably securing an implement to a tractor that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of my invention securing a corn picker to a tractor and with a section of the corn picker cut away to more fully illustrate its construction.

Fig. 2 is a top plan view of a tractor and rear portion of a corn picker with my attaching means in use, with portions of the corn picker cut away.

Fig. 3 is an enlarged perspective view of the right side portion of my device mounted on a separate side bar that is designed to be secured to the right side frame of the tractor.

Fig. 4 is a side elevational view of my device mounted directly on the tractor frame instead of a separate side bar, and showing fragmentary portions of the implement parts used in attaching the same to the tractor.

Fig. 5 is a side view of the part shown in Fig. 4 and illustrates its operation at the moment of securing an implement to a tractor.

All implements such as corn pickers must be secured to the tractor used in the corn picking operation. Usually the methods used employ a number of bolts that must be removed or replaced each time the tractor is secured to or removed from the corn picker. This, of course, is a tedious operation and requires considerable valuable time. Furthermore, it is a most difficult task to align the various holes provided in the corn picker and tractor for the insertion of the bolts. I have overcome all such problems by my new automatic coupling means and which I will now describe in detail.

The numeral 10 designates an ordinary tractor having the usual right side frame 11 and the left side frame 12. The numeral 13 designates an ordinary corn picker having the usual two spaced apart rearwardly and upwardly extending portions 14 and 15. It is to such tractors and implements that I install my attaching means.

The numeral 16 designates an inwardly extending stub shaft secured to the inside of the portion 14. The numeral 17 designates a similar stub shaft secured to the inside of the portion 15. These two shafts extend toward each other, are located well forward from the rear ends of the corn picker, as shown in Fig. 2, and are designed to be permanently fixed.

The numeral 18 designates a vertical bar secured at its upper portion to the inner side of the portion 14. A similar bar 19 is secured to the inner side of the portion 15. These two bars extend downwardly below the rear portions of the corn picker portions 14 and 15, are positioned near the rear ends thereof, respectively, and each has a rearwardly and downwardly extending open notch 20, as shown in the drawings.

The parts 16, 17, 18 and 19 are the only ones secured to the implement.

The numeral 21 designates a shaft rotatably mounted to the tractor chassis, located near the front thereof, and extending transversely of the longitudinal axis of the tractor, as shown in Fig. 2.

Rigidly secured to the left end portion of the shaft 21 is an L-member 22 and similarly secured to the right end portion of said shaft 21 in the L-member 22a. In the front top of the horizontal portion of each of these L-members is a slot or notch opening 23 that extends first downwardly and then rearwardly, as shown in Fig. 1. The numeral 24 designates an ordinary catch hand lever arm secured on the operator's platform of the tractor. The numeral 25 designates a link connecting the hand lever 24 to the top portion of the L-members 22a. The numeral 26 designates an outwardly extending horizontal spool or lug secured to the frame side 12 of the tractor and similarly secured to the frame side 11 is the spool 26a. These two spools 26 and 26a are located a substantial distance to the rear of the L-members 22 and 22a and are both in the same transverse plane relative to the tractor, as shown in Fig. 2. The numeral 27 designates an ordinary jack secured to the corn picker and which may be held upwardly out of the way by a chain 28 when not in use.

The shaft 21, its bearings (not shown), the

L-members 22 and 22a and spools 26 and 26a may be secured direct to the side frames 11 and 12 of the tractor, as shown in Figs. 1, 2, 4 and 5, if desired. In this respect, spools 26 and 26a are mounted directly upon the respective frame sides 12 and 11, and L-members 22 and 22a are secured to the respective bar brackets 30 and 31 that are secured respectively to frame sides 12 and 11 as shown in Fig. 2. However, to facilitate installation, these parts may be secured to side bars 29 (as shown in Fig. 3) and then these side bars secured by bolts or like to the two side frames, respectively, of the tractor. The practical operation of my invention is as follows:

With the jack 27 supporting the rear end of the corn picker, the tractor is guided into the rear of the picker and between the two portions 14 and 15. The L-members 22a and 22 at this time are placed as shown in Fig. 3 and Fig. 4 to receive the respective stub shafts 16 and 17 of the corn picker. At this time the spools or lugs enter the notches 20 of the members 18. By moving the lever 24 to the rear the L-members will be elevated (as shown in Fig. 5) thereby bringing the stub shafts 16 and 17 into the rear of the notches 23 of the L-members. The distance between the stub shafts and the notches 20 is the same as the distance between the rear portions of each notch 23 and one of the spools. Therefore, when the stub shafts are in the notches 23 as shown in Fig. 2, and the spools are in the notches 20 as shown in Fig. 5, the corn picker will be secured to the tractor. This coupling action is substantially automatic. The stub shafts when in the rear of the notches 23 can not accidentally move upwardly and can not move forwardly because of the notches 20 engaging the front and tops of the spools. To detach the corn picker from the tractor it is merely necessary to place the lever 24 forwardly, thereby lowering the L-members so that the stub shafts can pass therefrom, and move the tractor rearwardly from the corn picker. The jack 27 may be used in either operation, and of course is used to hold up the rear end of the corn picker after the tractor has been detached therefrom.

While I have explained my device as associated with corn pickers, obviously it may be used on other types of implements or equipment used in connection with tractors.

Some changes may be made in the construction and arrangement of my means for detachably securing an implement to a tractor without departing from the real spirit and purpose of my invention, and it is my intention to cover by my claims, any modified forms of structure or use of mechanical equivalents which may be reasonably included within their scope.

I claim:

1. In combination with a tractor and an implement, an attaching means, comprising, a transverse shaft rotatably mounted on and near the front end portion of said tractor, means for manually rotating said shaft, an L-member rigidly secured to each end portion of said shaft, said member having a downwardly and then rearwardly extending notch in the upper front end of the normally horizontal portion of each of said L-members, an outwardly extending horizontal spool on each side of said tractor and located to the rear of said L-members, two stub shafts on said implement capable of entering and engaging the notches in said two L-members respectively, and two rigid members on said implement each having a notch opening to the rear for receiving and engaging said two spools, respectively, the distance between the respective notches in said L-members and said spools on each side of said tractor being the same as that between the respective stub shafts and notches in the rigid members on each side of said implement.

2. In combination with a tractor and an implement, an attaching means, comprising, a transverse shaft rotatably mounted on and near the front end portion of said tractor, means for manually rotating said shaft, an L-member rigidly secured to each end portion of said shaft, said member having a downwardly and then rearwardly extending notch in the upper front end of the normally horizontal portion of each of said L-members, an outwardly extending horizontal spool on each side of said tractor and located to the rear of said L-members, two stub shafts on said implement capable of entering and engaging the notches in said two L-members respectively, two rigid members on said implement each having a notch opening to the rear for receiving and engaging said two spools respectively, and a manually operable lockable lever operatively connected to said shaft.

RICHARD B. SHORE.

References Cited in the file of this patent

UNITED STATES PATENTS

| Number | Name | Date |
| --- | --- | --- |
| Re. 22,279 | Hyman et al. | Mar. 2, 1943 |
| 2,346,330 | Ratcliff | Apr. 11, 1944 |
| 2,368,290 | Donald | Jan. 30, 1945 |
| 2,376,541 | Johnson et al. | May 22, 1945 |
| 2,488,698 | Acton | Nov. 22, 1949 |